US012028725B2

(12) United States Patent
Koshiji et al.

(10) Patent No.: US 12,028,725 B2
(45) Date of Patent: Jul. 2, 2024

(54) MESSAGE RELAY APPARATUS AND METHOD

(71) Applicant: Nippon Telegraph and Telephone Corporation, Tokyo (JP)

(72) Inventors: Kojun Koshiji, Tokyo (JP); Naoki Higo, Tokyo (JP); Takuma Tsubaki, Tokyo (JP); Toshimitsu Tsubaki, Tokyo (JP); Takeshi Kuwahara, Tokyo (JP); Masanao Nakano, Tokyo (JP); Yuki Yano, Tokyo (JP); Takao Kurahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 408 days.

(21) Appl. No.: 17/429,659

(22) PCT Filed: Feb. 4, 2020

(86) PCT No.: PCT/JP2020/004016
§ 371 (c)(1),
(2) Date: Aug. 10, 2021

(87) PCT Pub. No.: WO2020/170790
PCT Pub. Date: Aug. 27, 2020

(65) Prior Publication Data
US 2022/0210673 A1    Jun. 30, 2022

(30) Foreign Application Priority Data
Feb. 18, 2019    (JP) .................... 2019-026675

(51) Int. Cl.
*H04W 24/04*        (2009.01)
*H04W 24/02*        (2009.01)
(Continued)

(52) U.S. Cl.
CPC .......... *H04W 24/04* (2013.01); *H04W 24/02* (2013.01); *H04W 24/10* (2013.01); *H04W 28/14* (2013.01); *H04W 72/20* (2023.01); *H04W 88/04* (2013.01)

(58) Field of Classification Search
CPC ..... H04W 24/04; H04W 24/02; H04W 24/10; H04W 28/14; H04W 72/20; H04W 88/04
(Continued)

(56) References Cited

U.S. PATENT DOCUMENTS

| 7,617,337 | B1 * | 11/2009 | Beck | ................... | H04L 65/752 |
| | | | | | 370/232 |
| 2017/0155930 | A1 * | 6/2017 | Park | ................ | H04N 21/85406 |
| 2019/0306098 | A1 * | 10/2019 | Jang | ..................... | H04L 51/063 |

FOREIGN PATENT DOCUMENTS

| JP | 2003143237 | 5/2003 |
| JP | 2013219438 | 10/2013 |
| JP | 2017041714 | 2/2017 |

* cited by examiner

Primary Examiner — Michael Y Mapa
(74) Attorney, Agent, or Firm — Fish & Richardson P.C.

(57) ABSTRACT

A message relay apparatus and a message relay method that achieve high message reachability taking communication network situation into consideration are provided. A message relay apparatus 100 interposed between an application 20 and a device 30 includes a device communication state determination functional unit 131 that determines communication availability with the device 30, a network state estimation unit 133 that estimates a network state based on the communication availability, and a message processing unit 110 that determines forwarding availability of an application message based on the network state and buffers the application message when forwarding is not available.

10 Claims, 9 Drawing Sheets

(51) Int. Cl.
*H04W 24/10* (2009.01)
*H04W 28/14* (2009.01)
*H04W 72/20* (2023.01)
*H04W 88/04* (2009.01)

(58) Field of Classification Search
USPC ............. 370/315; 455/7, 412.1–412.2, 414.1
See application file for complete search history.

MESSAGE RELAY APPARATUS AND METHOD

CROSS-REFERENCE TO RELATED APPLICATIONS

This application is a National Stage application under 35 U.S.C. § 371 of International Application No. PCT/JP2020/004016, having an International Filing Date of Feb. 4, 2020, which claims priority to Japanese Application Serial No. 2019-026675, filed on Feb. 18, 2019. The disclosure of the prior application is considered part of the disclosure of this application, and is incorporated in its entirety into this application.

TECHNICAL FIELD

The present disclosure relates to a message relay apparatus and a message relay method for improving message reachability to a device in a communication mode such as a server-client model that transmits a message from an application constructed on a server, such as a cloud, to a device.

BACKGROUND ART

With the progress of Internet of Things (IoT) techniques, IoT services for controlling devices by communicating with various applications through a communication network has increased.

In such IoT services, in a case where a device moves such as a mobile robot or the like, a communication network in a wireless section is highly likely to become unstable, and thus, in such state, it is not possible to cause a message to reach the device.

A technique disclosed in Patent Literature 1 has been proposed as a technique for improving message reachability. According to the technique disclosed in Patent Literature 1, in an IoT service in a communication mode such as a server-client model that transmits a message from an application constructed on a server, such as a cloud, to a device, in a case where a device is not in a communicable state when a message is transmitted from an application to a device, a communication node apparatus provided on a communication network temporarily holds the message and forwards the message when the device transitions to a communicable state.

CITATION LIST

Patent Literature

PTL 1: JP 2017-41714 A

SUMMARY OF THE INVENTION

Technical Problem

In a situation in which a device is in a non-communicable state, it is highly likely that the device is in an unstable communication network environment in which the device is repeatedly in a communicable state and a non-communicable state. For this reason, even when the device transitions to a communicable state, it is highly likely that the device will immediately transition to a non-communicable state again. Even when a message is forwarded in such an environment, it is unable to reach the message.

In the technique disclosed in Patent Literature 1, a temporarily held message is forwarded when a device transitions to a communicable state, and thus an unstable communication network is not taken into consideration.

In this manner, in order to improve message reachability, it is necessary to consider not only whether the device can communicate or not, but also whether a communication network environment of the device is unstable.

The present disclosure has been made in view of the above-described circumstances, and an object thereof is to provide a message relay apparatus and a message relay method that achieve high message reachability taking a communication network situation into consideration.

Means for Solving the Problem

In order to achieve the above-described object, the present disclosure provides a message relay apparatus that receives an application message transmitted to a terminal by an application and forwards the received application message to a destination terminal, and the message relay apparatus includes a communication availability determination unit configured to determine communication availability with the terminal, a network state estimation unit configured to estimate a network state between the terminal and the message relay apparatus based on the communication availability state, and a message processing unit configured to determine forwarding availability of the application message based on the network state estimated for the destination terminal of the application message received from the application and to buffer the application message in when forwarding is not available.

Effects of the Invention

According to the present disclosure, it is determined whether or not a message can be forwarded in consideration of the state of a communication network, and thus it is possible to suppress a failure in message forwarding and improve message reachability. In addition, whether or not a message can be forwarded is determined in consideration of a communication network state, and thus unnecessary message retransmission due to a failure in message forwarding can be avoided, and a resource such as a communication network band can be efficiently used.

DESCRIPTION OF EMBODIMENTS

An outline of a message relay system of the present disclosure will be described. In the present disclosure, in a communication mode such as a server-client model, a message relay apparatus disposed in a network previously estimates the state of a communication network which is a communication path of a message. Further, in the present disclosure, when a message is transmitted from an application constructed on a server to a device which is a client, the message is forwarded or buffered based on results of the estimation.

Figure 1:
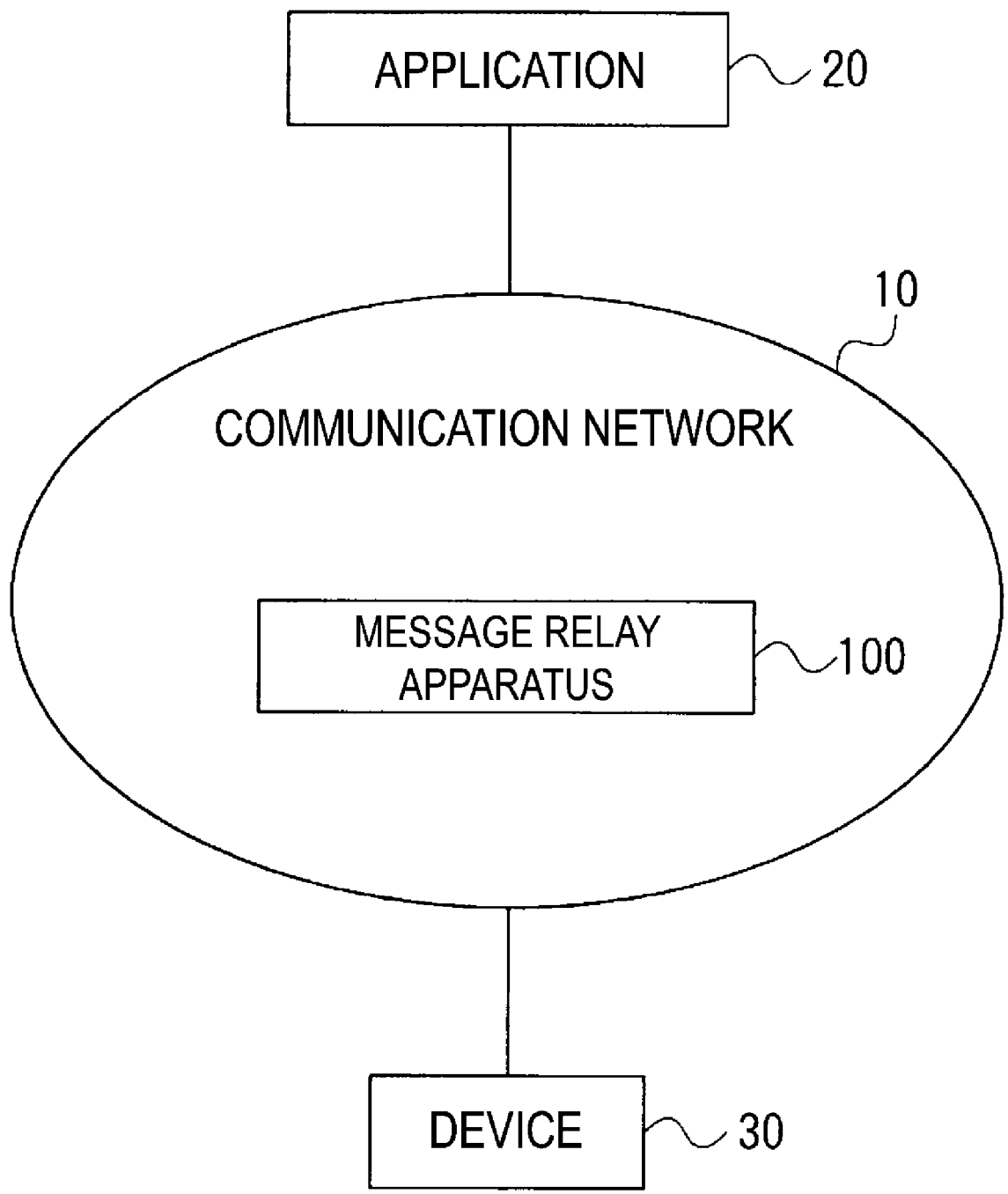
FIG. 1 is a diagram illustrating an overall configuration of a message relay system according to an embodiment.

Next, a message relay system according to an embodiment of the present disclosure will be described with reference to FIG. 1. FIG. 1 is a diagram illustrating an overall configuration of the message relay system according to the embodiment of the present disclosure.

As illustrated in FIG. 1, in the message relay system, one or more applications 20 and one or more devices 30 are communicatively connected to a communication network 10. A message relay apparatus 100 according to the present embodiment is disposed in the communication network 10.

The application 20 is an application that transmits a message to the device 30. The implementation form of the application 20 does not matter, and the application 202 may be implemented on a physical server or on a virtual server. In a typical example, the application 20 is implemented on a cloud server on the Internet. As another example, the application 20 is implemented on a server deployed in a data center of a line provider network or a base station. The application 20 is provided by a service provider. It should be noted that the number of the application 20 communicating with the device 30 is not necessarily one on the message relay system.

The application 20 is an application in an application layer which is a seventh layer of an open systems interconnection (OSI) reference model. That is, a message transmitted from the application 20 to the device 30 is a message in the application layer. Note that, in the following description, a message transmitted from the application 20 to the device 30 will be referred to as an "application message". A protocol to be used to transmit the application message does not matter, and examples of the protocol include a lightweight protocol for machine to machine (M2M) such as a constrained application protocol (CoAP) or a message queuing telemetry transport (MQTT), a highly functional protocol such as hypertext transfer protocol (HTTP) or HTTP/2, and the like. In the server in which the application 20 is implemented, a protocol stack or an apparatus in a layer located lower than an application layer which is required for the transmission of the application message is mounted. In the present embodiment, an application message is transmitted using a transmission control protocol/Internet protocol (TCP/IP), but any of other protocol stacks may be used. Further, in the present embodiment, when an application message is transmitted, a TCP which is a connection-type protocol for forming a connection and transmitting data in a transport layer is used. Note that the present disclosure can also be implemented using a connectionless protocol such as a user datagram protocol (UDP).

The communication network 10 forms a communication path between the application 20 and the device 30. The communication network 10 can be constituted by a plurality of networks. In the present disclosure, it is assumed that the communication path between the message relay apparatus 100 and the device 30 includes a wireless communication section. In a typical example, a wireless communication section is included as an access line for the device 30. Note that the present disclosure can also be applied when the communication network 10 does not include a wireless communication section. In the communication network 10, a protocol stack below a transport layer required for the transmission of an application message is supported. In the present embodiment, a protocol stack of TCP/IP is supported.

The device 30 is an apparatus that receives an application message from the application 20 and performs a predetermined operation based on the application message. In response to the application 20 and the communication network 10, the device 30 supports a protocol in an application layer for receiving an application message and a protocol stack in a layer below the application layer. In the present embodiment, a protocol stack of TCP/IP is supported. It should be noted that the number of the device 30 is not necessarily one on the message relay system.

Figure 2:
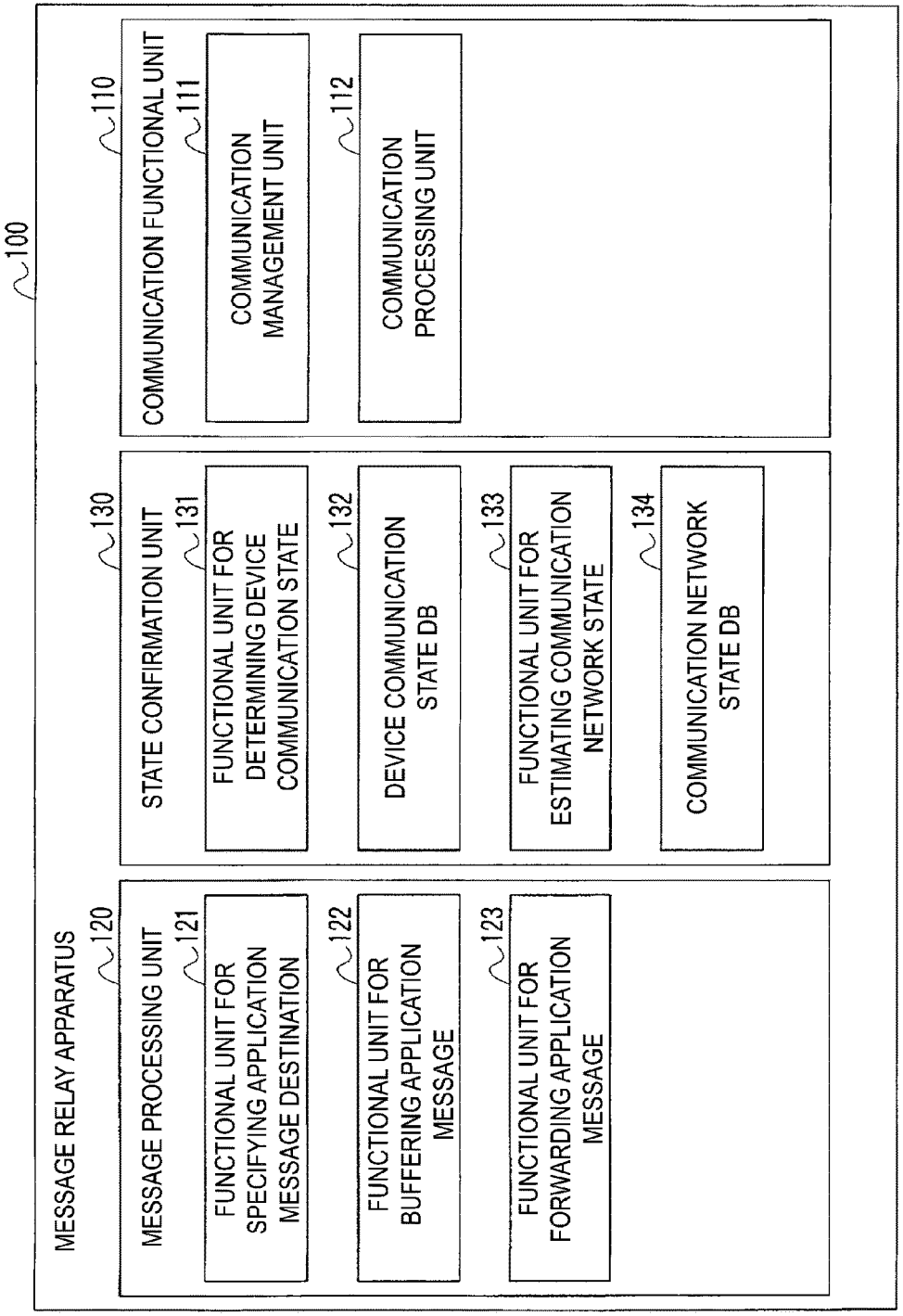
FIG. 2 is a functional block diagram of a message relay apparatus.

The message relay apparatus 100 functions to receive an application message transmitted from the application 20 to the device 30 and forward the application message to the device 30. Hereinafter, details of the message relay apparatus 100 will be described with reference to FIG. 2. FIG. 2 is a functional block diagram of the message relay apparatus.

As illustrated in FIG. 2, the message relay apparatus 100 includes a communication functional unit 110, a message processing unit 120, and a state confirmation unit 130. Here, the implementation form of the message relay apparatus 100 does not matter, and the message relay apparatus 100 does not need to be implemented as a single node. That is, although the message relay apparatus 100 is provided with three functional units in FIG. 2 for convenience of description, there is no restriction on implementation except for the communication functional unit 110 which is commonly used by the other functional units.

The communication functional unit 110 is a functional unit in a layer located lower than an application layer transmitting and receiving an application message, and provides various functions of the transport layer or lower layers with respect to a higher layer. The communication functional unit 110 is commonly used by the message processing unit 120 and the state confirmation unit 130. The communication functional unit 110 includes a communication management unit 111 and a communication processing unit 112.

The communication management unit 111 controls and manages communication performed by the communication processing unit 112. For example, the communication management unit 111 performs management required to achieve communication, such as identification of communication per 5-tuple and formation, maintenance, and, management of transmission control protocol (TCP) connection. The communication processing unit 112 transmits and receives data to and from a device such as an application server or the device 30 through the communication network 10.

The message processing unit 120 is a functional unit that receives an application message from the application 20 through the communication functional unit 110, temporarily stores (buffers) the received application message as necessary, and forwards the application message to the device 30 through the communication functional unit 110. Here, it should be noted that connection in the transport layer used for communication with the application 20 is different from connection in the transport layer used for communication with the device 30. That is, connection used for the transmission of an application message by the application 20 is terminated with the communication functional unit 110 of the message relay apparatus 100. Similarly, the connection used to receive the application message by the device 30 is terminated with the communication functional unit 110 of the message relay apparatus 100.

The message processing unit 120 includes a functional unit for specifying an application message destination 121, a functional unit for buffering an application message 122, and a functional unit for forwarding an application message 123.

The functional unit for specifying an application message destination 121 specifies the device 30 that is a destination of an application message received from the application 20. The specification processing is performed by, for example, identification information in an application level of the device 30, performed pea 5-tuple, or a combination thereof.

The functional unit for buffering an application message 122 is a function of temporarily holding an application message in a case where forwarding availability (to be described later) with respect to the device 30 serving as a destination of a message received from the application 20 is a "forwarding-unavailable" state. When the forwarding availability with respect to the device 30 that is a destination of the application message held in the functional unit for buffering an application message 122 is set to be in a "forwarding-available" state, the application message is transmitted to the destination device 30 by the functional unit for forwarding an application message 123 and deleted from the functional unit for buffering an application message 122.

The functional unit for forwarding an application message 123 determines whether the message received from the application 20 can be forwarded, that is a "forwarding-available" state or a "forwarding-unavailable" state, with respect to the device 30 that is the destination of the message. When the determination processing is performed, the functional unit for forwarding an application message 123 refers to a device communication state DB 132 and a communication network state DB 134 of the state confirmation unit 130 to be described later. As a result of the determination, in the case of a "forwarding-available" state, the functional unit for forwarding an application message 123 transmits the application message to the destination device 30 through the communication functional unit 110. On the other hand, in the case of a "forwarding-unavailable" state, the functional unit for forwarding an application message 123 stores the application message in the functional unit for buffering an application message 122. In addition, when the functional unit for forwarding an application message 123 detects that the forwarding availability of the application message held in the functional unit for buffering an application message 122 with respect to the destination device has transitioned to a "forwarding-available" state, the functional unit for forwarding an application message 123 extracts the application message from the functional unit for buffering an application message 122, transmits the application message to the destination device 30, and deletes the application message from the functional unit for buffering an application message 122. The detection processing is performed with reference to a communication network state DB 134 of the state confirmation unit 130 to be described later.

Figure 3:
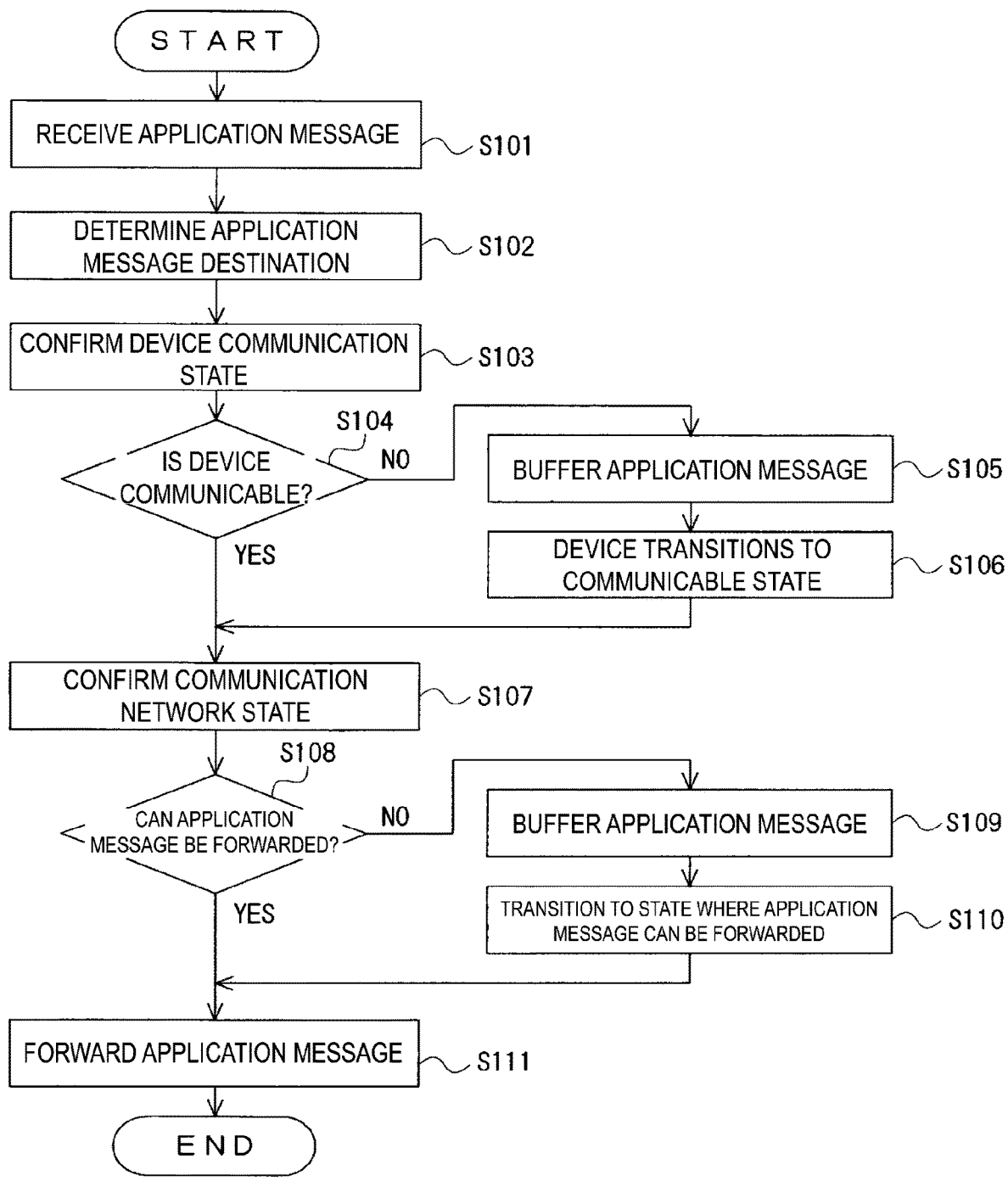
FIG. 3 is an example of a message forwarding flowchart.

Operations of the message processing unit 120 will be described with reference to a flowchart of FIG. 3. When the message processing unit 120 receives an application message (step S101), the message processing unit 120 specifies the device 30 serving as a destination of the application message (step S102). First, the message processing unit 120 confirms communication availability with respect to the device 30 with reference to the device communication state DB 132 of the state confirmation unit 130 to be described later (step S103). Then, in a case where the device 30 is not in a communicable state, the message processing unit 120 temporarily stores the application message in the functional unit for buffering an application message 122 (steps S104 and S105) and waits until the device 30 transitions to a communicable state (step S106).

Next, the message processing unit 120 determines forwarding availability with respect to the device 30 (step S107). In the case of a "forwarding-unavailable" state, the message processing unit 120 temporarily stores the application message in the functional unit for buffering an application message 122 (steps S108 and S109) and waits until forwarding availability with respect to the device 30 transitions to a "forwarding-available" state (step S110). Next, the message processing unit 120 transmits the application message to the device 30 (step S111).

Note that the message processing unit 120 may first store all of the application messages received from the application 20 through the communication functional unit 110 in the functional unit for buffering an application message 122, and then perform determination of communication availability or forwarding availability with respect to the application messages stored in the functional unit for buffering an application message 122.

As illustrated in FIG. 2, the state confirmation unit 130 includes a functional unit for determining device communicability 131, the device communication state DB 132, a functional unit for estimating communication network state 133, and the communication network state DB 134.

The device communication state determination functional unit 131 determines a state indicating whether or not the device 30 is capable of communicating with the message relay apparatus 100 (communication availability), and stores the determined result in the device communication state DB 132 together with additional information as necessary. The determination result includes identification information of the device 30 and determination processing time information. In addition, the additional information includes various attribute information of the device 30 and information regarding the communication state of the device 30. Examples of the additional information include type information, positional information, moving direction information, and the like of the device 30.

Here, the state where the device 30 is capable of performing communication is a state where connection of the transport layer is formed between the message relay apparatus 100 and the device 30, and data can be transmitted and received on the connection. Thus, communication availability determination processing can be performed by determining normality of communication not only in the transport layer but also in layers located lower than the transport layer. Various methods can be used for communication availability determination processing. The communication availability determination processing includes, for example, (1) determining communication of a state confirmation message on connection of a transport layer formed between the message relay apparatus 100 and the device 30, (2) determining the state of connection of the transport layer between the message relay apparatus 100 and the device 30, and (3) acquiring and determining connection state information which is management information from another apparatus or a functional unit that manages the state of connection of the device 30 to the communication network 10 (hereinafter referred to as a "management apparatus" for convenience). The device communication state determination functional unit 131 may use any one of the determination methods, may use another method such as determination using communication confirmation of the device 30 by, for example, a PING, or may use a combination of the plurality of determination methods described above.

The device communication state determination functional unit 131 repeatedly performs communication availability determination processing and determination result storage processing on a regular basis, so that a plurality of communication availability states including the latest communication availability state for the device 30 are accumulated in the device communication state DB 132. An interval at which the present processing is performed does not matter, and it is only required that the interval is appropriately determined in consideration of the load of a network, the load of the message relay apparatus 100, and the like.

Figure 4:
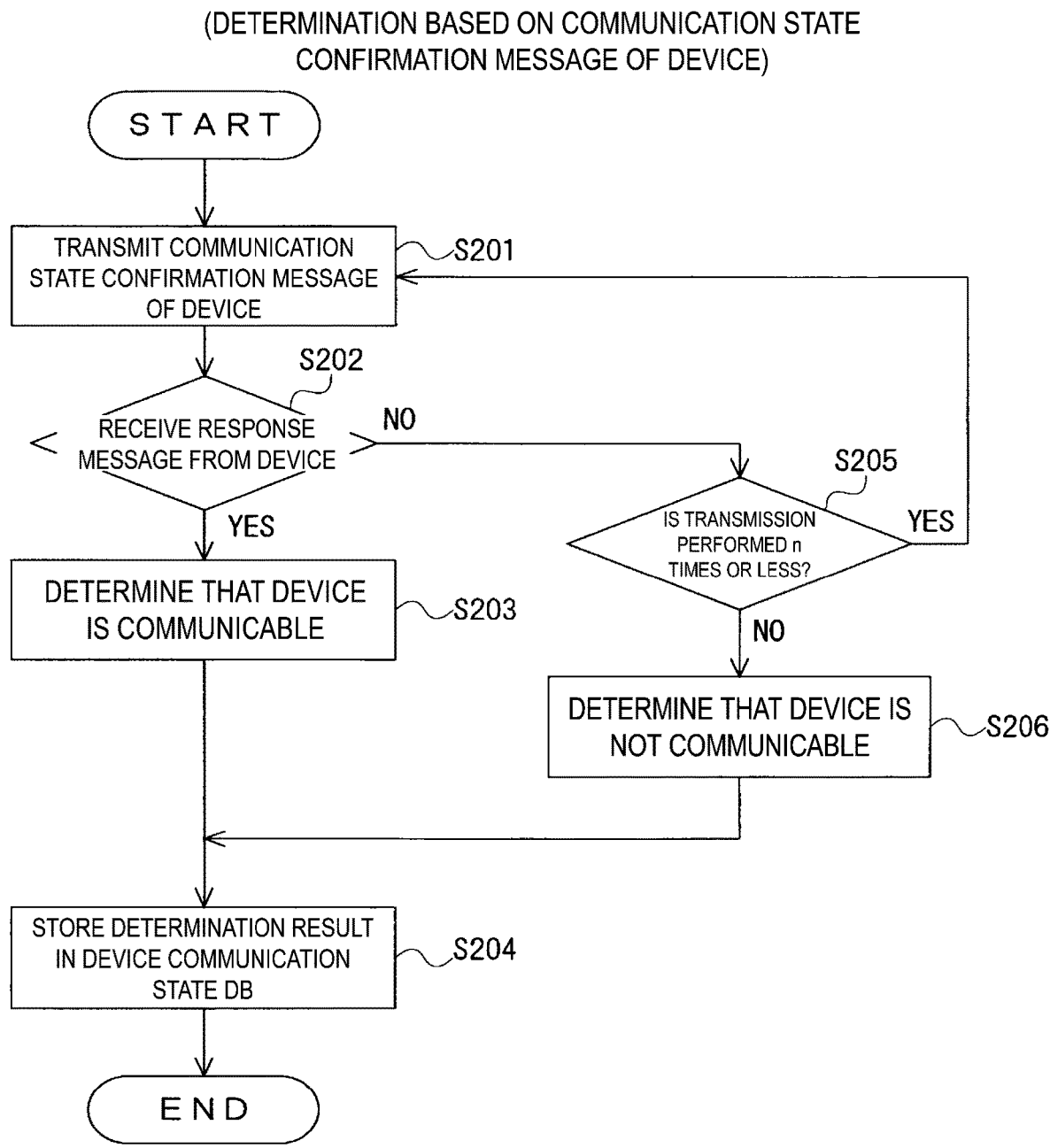
FIG. 4 is an example of a communication state determination flowchart of a device.

The method (1) using a state confirmation message will be described with reference to the flowchart of FIG. 4. As will be described below, the present method is based on the assumption that the device 30 is configured to respond with a response message to the state confirmation message upon receiving the state confirmation message.

The functional unit for determining device communication state 131 transmits a state confirmation message to the device 30 (step S201). When the message is transmitted, connection formed between the functional unit for determining device communication state 131 and the device 30 is used. In addition, this connection is common to that used to transmit an application message. Next, when the functional unit for determining device communication state 131 receives a response message from the device 30 (step S202), the functional unit for determining device communication state 131 determines that the device 30 is in a communicable state (step S203) and stores a determination result in the device communication state DB 132 (step S204). In a case where a response message is not received from the device 30 within a predetermined period of time, the functional unit for determining device communication state 131 repeatedly transmits a state confirmation message a predetermined number of times (n times) (steps S202 and S205). In a case where a response message cannot be received even when the functional unit for determining device communication state 131 repeatedly transmits a state confirmation message the predetermined number of times (n times), the functional unit for determining device communication state 131 determines that the device 30 is in a non-communicable state (step S206) and stores a determination result in the device communication state DB 132 (step S204).

Note that state confirmation message retransmission processing may be performed by the functional unit for determining device communication state 131, and in a case where a transport layer processing unit of the communication functional unit 110 has a retransmission processing function, the function may be used. In addition, the device 30 can add additional information to the response message. In this case, when the functional unit for determining device communication state 131 stores the determination result in the device communication state DB 132, additional information can be stored together with the determination result.

Figure 5:
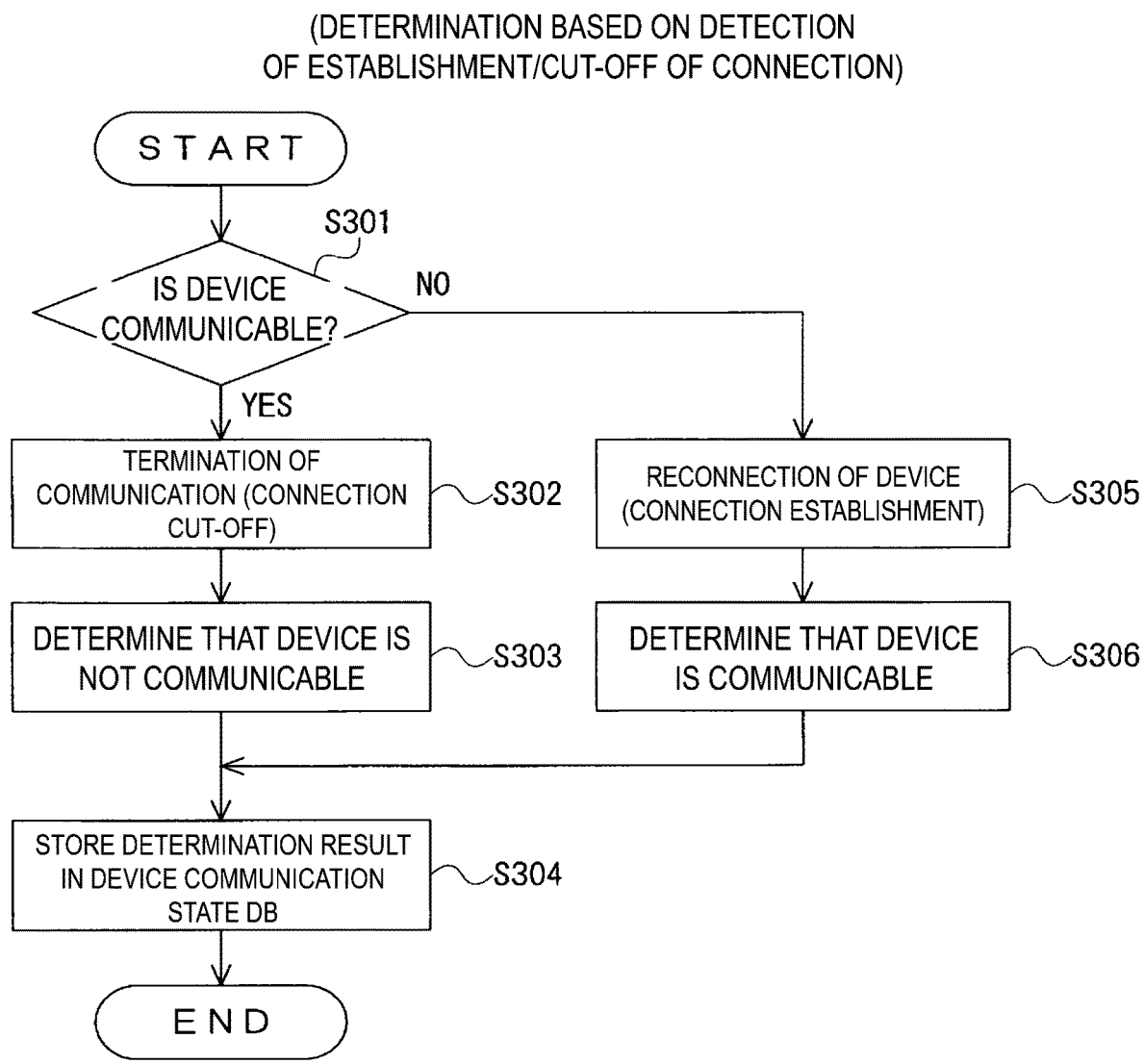
FIG. 5 is an example of a communication state determination flowchart of a device.

The method (2) based on the state of connection will be described with reference to the flowchart of FIG. 5. In the present method, the functional unit for determining device communication state 131 determines a communication state of the device 30 based on the detection of a state transition of connection between the message relay apparatus 100 and the device 30 using the communication management unit 111 of the communication functional unit 110, and specifically, based on the detection of establishment or cut-off of connection.

When the functional unit for determining device communication state 131 detects cut-off of connection due to the termination of communication of the device 30 in a state where connection has been established and the device 30 is capable of performing communication (steps S301 and S302), the functional unit for determining device communication state 131 determines that the device is in a non-communicable state (step S303) and stores a determination result in the device communication state DB 132 (step S304). On the other hand, when the functional unit for determining device communication state 131 detects that connection has been established by the device 30 being connected to the communication network 10 again in a state where connection has been cut off and the device 30 is not capable of performing communication (steps S301 and S305), the functional unit for determining device communication state 131 determines that the device 30 is in a communicable state (step S306) and stores a determination result in the device communication state DB 132 (step S304).

Figure 6:
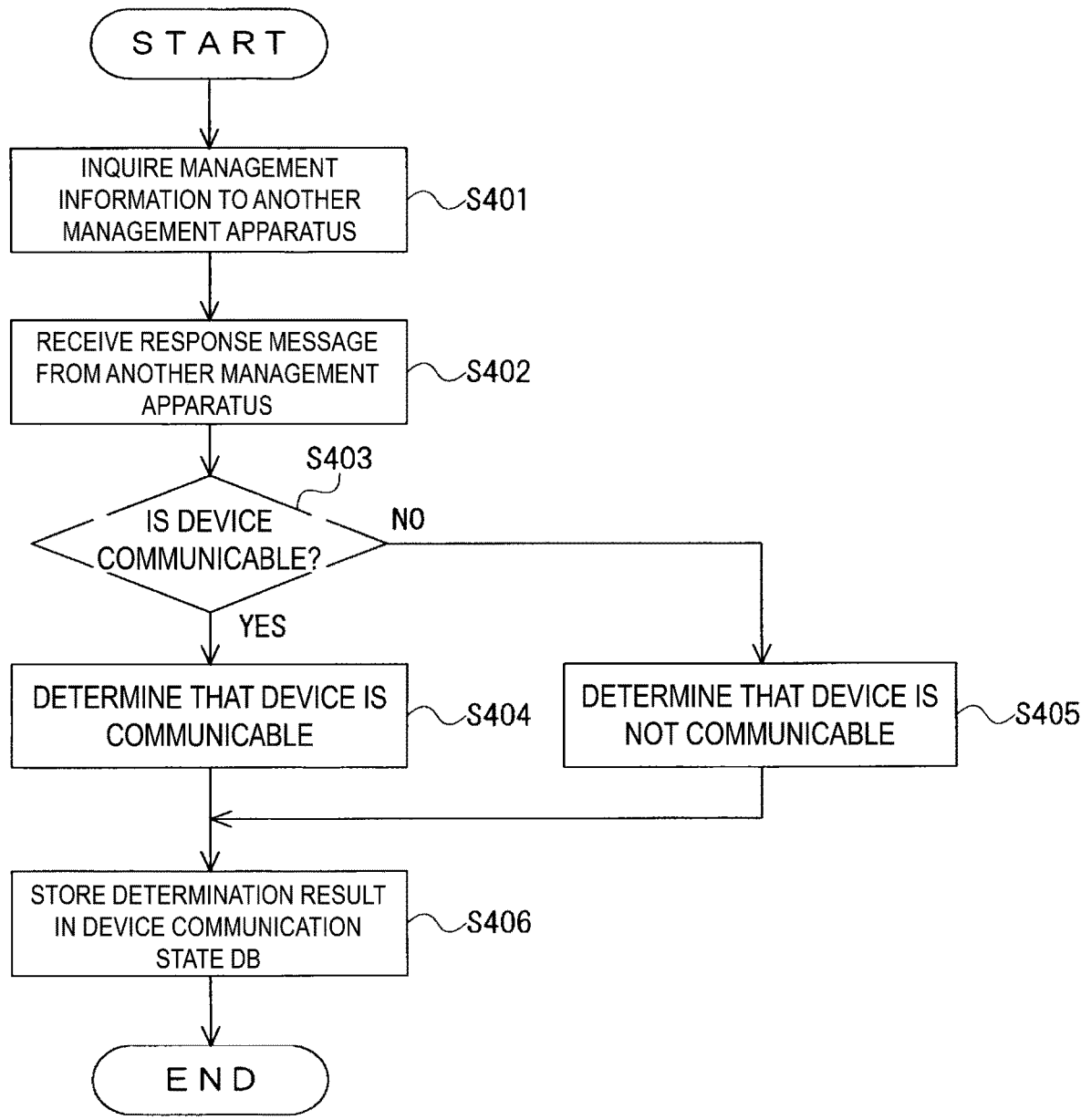
FIG. 6 is an example of a communication state determination flowchart of a device.

The method (3) based on connection state information acquired from another management apparatus will be described with reference to the flowchart of FIG. 6. Another management apparatus that acquires connection state information in the present method is an apparatus that manages connection of the device 30 to the communication network 10. For example, in a case where the communication network 10 includes a mobile communication network such as Long Term Evolution (LTE) and the device 30 is accommodated in the mobile communication network, examples of the management apparatus include a base station, a mobility management apparatus, a relay apparatus, and the like in the mobile communication network.

The functional unit for determining device communication state 131 transmits an inquiry message for connection state information to another management apparatus (step S401), and receives a response message including connection state information from the other management apparatus (step S402). Then, the functional unit for determining device communication state 131 determines communication availability of the device 30 based on the connection state information included in the response message (steps S403 to S405), and stores a determination result in the device communication state DB 132 (step S406).

The functional unit for estimating communication network state 133 estimates the state of the communication network 10 between the device 30 and the message relay apparatus 100, that is, the state of a communication path between the device 30 and the message relay apparatus 100, based on the communication availability information of the device 30 stored in the device communication state DB 132. More specifically, the functional unit for estimating communication network state 133 estimates the state of the communication network 10 based on changes in the communication availability state of the device 30 over time. Then, the functional unit for estimating communication network state 133 stores estimated results in the communication network state DB 134 together with additional information as necessary. Here, the additional information is information which is used in the estimation processing. In the present embodiment, the functional unit for estimating communication network state 133 estimates the state of the communication network 10 for the device 30 based on intervals at which the device 30 becomes non-communicable.

The functional unit for estimating communication network state 133 repeatedly performs communication network state estimation processing and estimation result storage processing on a regular basis, and thus the latest communication network state for the device 30 is stored in the communication network state DB 134. The interval at which the present processing is performed does not matter and the interval may be appropriately determined in consideration of the load of the message relay apparatus 100, and the like. In addition, the present processing may be performed independently from the processing of the functional unit for determining device communication state 131, may be performed subsequently to the processing of the functional unit for determining device communication state 131, or may be performed only when the device communication state DB 132 has been updated through the processing of the functional unit for determining device communication state 131.

Figure 7:
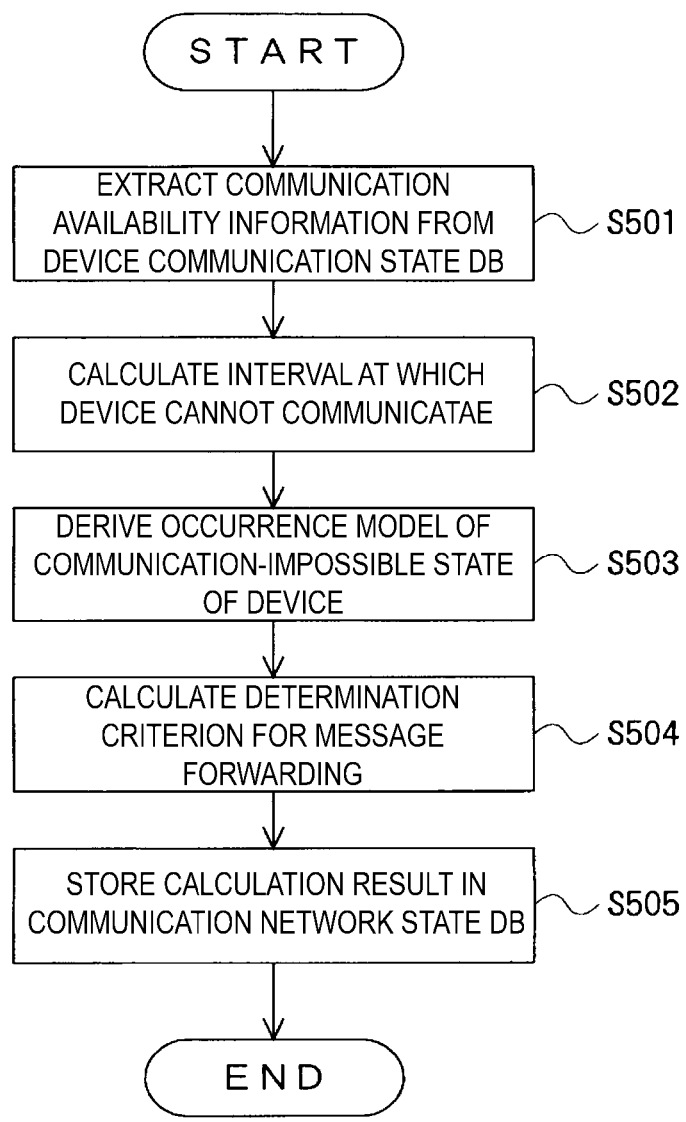
FIG. 7 is an example of a state estimation flowchart of a communication network.

Operations of the functional unit for estimating communication network state 133 will be described with reference to the flowchart of FIG. 7. The functional unit for estimating communication network state 133 acquires a communication availability state of the device 30 from the device communication state DB 132 (step S501), and calculates an interval at which the device 30 become non-communicable (step S502). Next, the functional unit for estimating communication network state 133 derives an occurrence model for a non-communicable state of the device 30 based on the calculated interval at which a non-communicable state of the device 30 occurs (step S503). Next, the functional unit for estimating communication network state 133 calculates a reference value which is used for determining forwarding availability of an application message in the functional unit for forwarding an application message 123 of the message processing unit 120 based on the occurrence model (step S504), and stores the calculated reference value in the communication network state DB 134 as an estimation result (step S505).

According to the message relay apparatus of the present embodiment, it is determined whether or not an application message can be forwarded in consideration of the state of the communication network 10, and thus it is possible to avoid a failure in forwarding an application message and to improve the reachability of a message. In addition, according to the message relay apparatus of the present embodiment, it is determined whether or not an application message can be forwarded in consideration of the state of the communication network 10, and thus it is possible to suppress unnecessary retransmission of a message due to the forwarding of an application message and to efficiently use resources such as bands of the communication network 10.

Example

Figure 8:
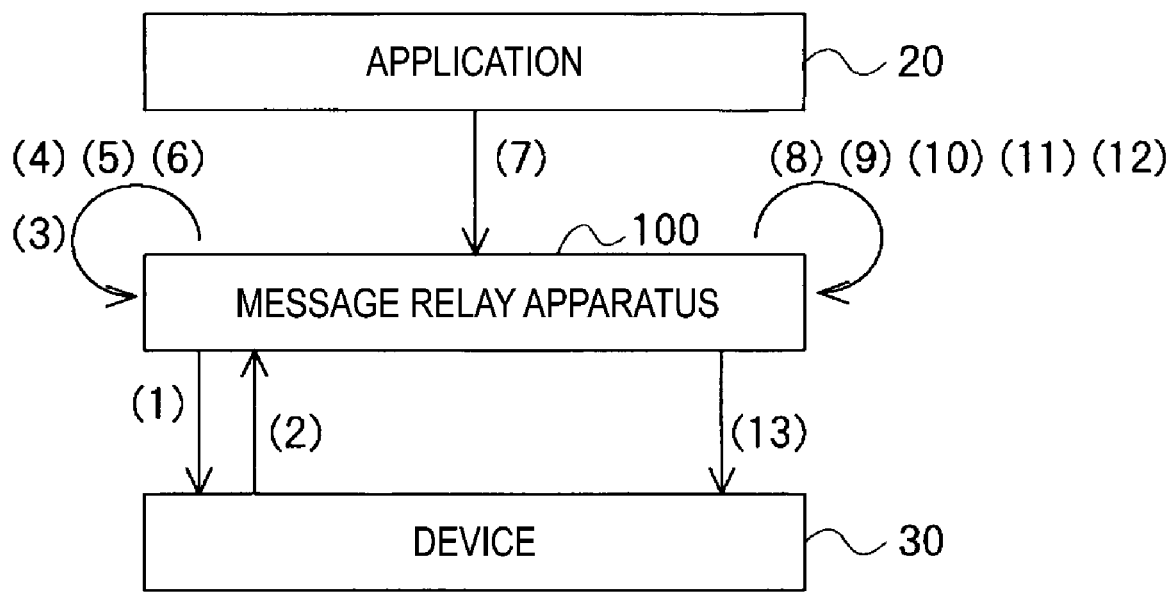
FIG. 8 is a diagram illustrating an overall configuration of a message relay system according to an embodiment example.

A message relay system according to an example of the present disclosure will be described with reference to the drawings. Here, an example of the forwarding of an application message in the overall configuration as illustrated in FIG. 8 will be described. Here, as described above, there may be a plurality of applications 20 and devices 30. In addition, functional units and functions constituting the message relay apparatus 100 do not need to be implemented in a single node.

Practically, processing is performed based on flows of FIGS. 3 to 7 described above, and thus parallel processing is also performed. However, for convenience of explanation, numbers (1) to (13) are assigned to respective procedures. Here, procedures (1) to (3) are procedures for describing the flows of FIGS. 4 to 6, procedures (4) to (6) are procedures for describing the flow of FIG. 7, and procedures (7) to (13) are procedures for describing the flow of FIG. 3. Hereinafter, the procedures will be described.

Procedure (1): The message relay apparatus 100 transmits a communication state confirmation message to the device 30.

Procedure (2): The device 30 returns a response message to the message relay apparatus 100 based on the communication state confirmation message.

Procedure (3): The message relay apparatus 100 receives the response message from the device 30 and determines that the device 30 is in a communicable state. Furthermore, a determination result is stored in the device communication state DB 132.

Procedure (4): The message relay apparatus 100 calculates a time interval $t_n$ at which a non-communicable state of the device 30 occurs, based on information of the device communication state DB 132.

Procedure (5): The message relay apparatus 100 determines a threshold value $t_{th}$ serving as a determination criterion for message forwarding performed in the procedure (12) to be described later, based on the time interval $t_n$ at which a non-communicable state of the device which is calculated in the procedure (4) occurs. A method of determining the threshold value $t_{th}$ will be described later.

Procedure (6): A calculation result in the procedure (5) is stored in the communication network state DB 134. In a case where a mathematical model such as an experience distribution function or a cumulative distribution function is derived by a threshold value determination method as in (c) to (d) to be described later, the mathematical model is also stored.

Procedure (7): The application 20 transmits an application message to the message relay apparatus 100.

Procedure (8): The message relay apparatus 100 receives the application message and determines a destination of the application message.

Procedure (9): The message relay apparatus 100 confirms the latest communication state of the device 30 which is the destination of the application message with reference to the device communication state DB 132. Here, in a case where the destination device 30 is in a non-communicable state, the message relay apparatus 100 temporarily holds the application message, and proceeds to the procedure (10) when the destination device 30 transitions to a communicable state.

Procedure (10): The message relay apparatus 100 extracts additional information such as the last time when the device 30 is set to be in a non-communicable state, and the type, position, and moving direction of the device which are stored in the device communication state DB 132.

Procedure (11): The message relay apparatus 100 calculates an elapsed time from the last time when the device 30 is set to be in a non-communicable state.

Procedure (12): The message relay apparatus 100 compares the threshold value $t_{th}$ stored in the communication network state DB 134 in the procedure (6) based on the information extracted in the procedure (10) described above with the elapsed time in the procedure (11) described above to determine that the application message can be forwarded when the elapsed time is greater than or equal to or greater than the threshold value $t_{th}$.

Procedure (13): The message relay apparatus 100 forwards the application message to the device 30. In a case where it is determined in the procedure (12) described above that the application message cannot be forwarded, the application message is held until the elapsed time in the procedure (11) described above is equal to or greater than the threshold value $t_{th}$ in the procedure (6).

In addition, recently, there has been an increase in the number of use cases where it is necessary to minimize a period of time for which a device is set to be in a non-communicable state, such as automatic traveling and remote control of a mobile device. Thus, in order to minimize a period of time for which the device 30 is set to be in a non-communicable state, the device is provided with an interface for a plurality of communication networks which is not limited to a single/multi-carrier such as Wi-Fi (registered trademark) or LTE. In this manner, in a case where there are a plurality of communication networks that can be used for message forwarding, the procedures (1) to (12) are performed on each of the communication networks, message forwarding is determined by each of the communication networks, and a message is forwarded using a communication network having a better determination result.

Threshold Value Determination Method

Next, an example of a method of determining the threshold value $t_{th}$ in the procedure (5) described above will be described in detail. This threshold value determination method is a determination method using a time interval $t_n$ at which a non-communicable state occurs when the device 30 is in an unstable environment of the communication network 10, as described above.

Note that, as another determination method, there is also a determination method using a period of time from when the device 30 starts to be present in an unstable environment of the communication network 10 and is first set to be in a non-communicable state to when the device 30 moves to a stable environment of the communication network 10 and transitions to a communicable state. This can be a determination method using the same logic as that of a threshold value determination method to be described below. In a case where a threshold value is determined according to this method, the elapsed time calculated in the procedure (11) described above needs to be set as a period of time from when the device starts to be present in an unstable environment of the communication network 10 and is first set to be in a non-communicable state to the current time.

In addition, the following threshold value determination method is an example, and thus it should be noted that other methods, such as a method in which a user using or operating the message relay apparatus 100 arbitrarily determines a threshold value, may be performed.

Threshold Value Determination Method (a)

As shown in the following Equation 1, an average value of n time intervals $t_n$ designated in advance is set to be a threshold value $t_{th}$. Note that a method of extracting a sample of a time interval $t_n$ which is used for the calculation of a threshold value will be described later.

$$t_{th} = \frac{\sum_i^n t_i}{n} \qquad \text{[Math. 1]}$$

Threshold Value Determination Method (b)

As shown in the following Equation 2, a maximum value of n time intervals $t_n$ designated in advance is set to be a threshold value $t_{th}$. Note that, similar to the method (a) described above, a method of extracting a sample of a time interval $t_n$ used for the calculation of a threshold value will be described later.

$$t_{th} = t_{max} \qquad \text{[Math. 2]}$$

Threshold Value Determination Method (c)

A median of n time intervals $t_n$ designated in advance is set to be a threshold value $t_{th}$. When pieces of target data being rearranged in ascending order are set to be $t_1, t_2, \ldots,$ and $t_n$, calculation is performed using a calculation formula shown in the following Equation 3. Note that, similar to the above-described methods (a) and (b), a method of extracting a sample of a time interval $t_n$ used for the calculation of a threshold value will be described later.

$$t_{th} = \begin{cases} t_{(\frac{n+1}{2})} \\ \dfrac{t_{(\frac{n}{2})} + t_{(\frac{n}{2}+1)}}{2} \end{cases} \qquad \text{[Math. 3]}$$

Threshold Value Determination Method (d)

A threshold value $t_{th}$ is analytically solved by performing numerical value calculation on the threshold value $t_{th}$ or obtaining an approximation function for an experience distribution function based on an experience distribution function of n time intervals $t_n$ designated in advance. An example of an experience distribution function is shown in the following Equation 4. A probability $F(t)$ that the threshold value $t_{th}$ is set to be a time t is determined arbitrarily by a user who uses or operates the message relay apparatus 100. Note that, similar to the above-described methods (a) to (c), a method of extracting a sample of a time interval $t_n$ used for the calculation of a threshold value will be described later.

$$F(t) = \frac{\#(1 \leq i \leq n \mid t_i \leq t)}{n} \qquad \text{[Math. 4]}$$

Threshold Value Determination Method (e)

It is assumed that n time intervals $t_n$ designated in advance follow a certain probability distribution, and a threshold value $t_{th}$ is numerically calculated based on a cumulative distribution function thereof. As an example, a probability density function in a case where the time intervals follow a normal distribution is shown in the following Equation 5. In addition, similar to the above-described method (d), a probability $F(t)$ that the threshold value $t_{th}$ is set to be a time t is determined arbitrarily by a user who uses or operates the message relay apparatus 100. Further, similar to the above-described methods (a) to (d), a method of extracting a sample of a time interval $t_n$ used for the calculation of a threshold value will be described later.

$$F(t) = \left(1 + \mathrm{erf}\,\frac{t-\mu}{\sqrt{2\sigma^2}}\right) \qquad \text{[Math. 5]}$$

Note that the signs used in the above-described Equations 1 to 5 are defined as follows.

$t_n$: A time interval at which a non-communicable state of the device occurs $t_{th}$: A threshold value which is a determination criterion for message forwarding $t_{max}$: A maximum value of n time intervals $t_n$ n: The number of pieces of data at time intervals used to calculate a threshold value $t_{th}$ F(t): A probability that a threshold value $t_{th}$ is set to be a time t μ: An average value of time intervals used to calculate a threshold value $t_{th}$ σ: A standard deviation of time intervals used to calculate a threshold value $t_{th}$ Sample Extraction Method for Time Interval tn As a time interval $t_n$ used for the calculation of a threshold value, the latest n time intervals may be extracted, time intervals may be extracted randomly, or time intervals may be extracted from time intervals conditioned by attribute information such as the type of device 30, the time of determination, the position, a moving direction/speed, and success information of message forwarding. Here, the following method will be described as an example.

Figure 9:
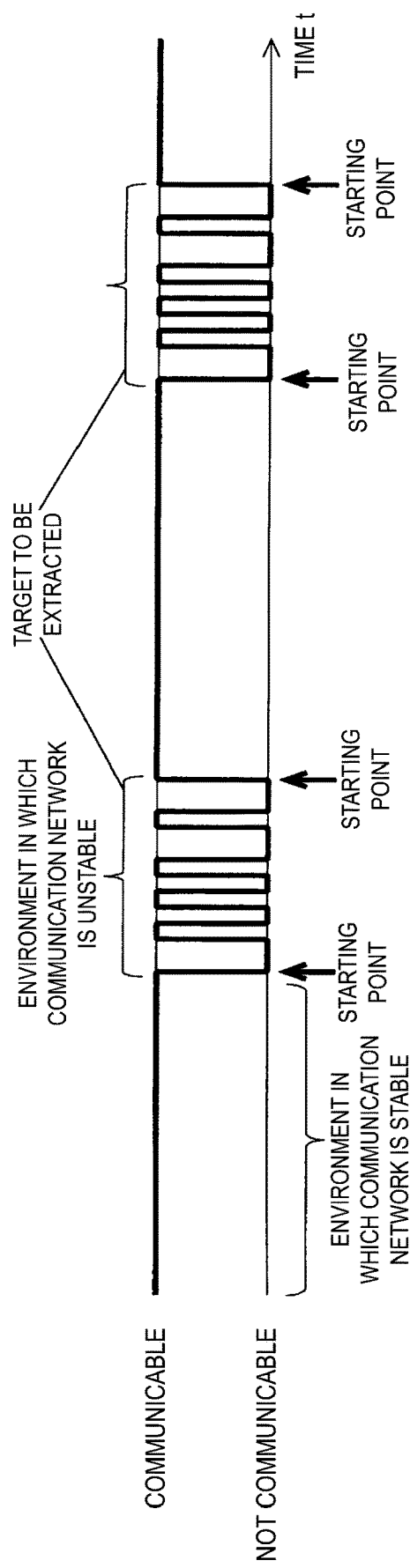
FIG. 9 is a diagram illustrating an image of a change in a communication network state.

As described above, in a situation in which the device 30 is set to be in a non-communicable state, it is highly likely that the device 30 will be present in an unstable environment of the communication network 10 in which the device 30 repeats a communicable state and a non-communicable state. For this reason, even when the device 30 transitions to a communicable state, it is highly likely that the device will immediately transition to a non-communicable state again. That is, a change in the state of the communication network 10 is a transition to a situation in which the device is an unstable environment of the communication network 10 having a short time interval $t_n$ after a situation in which the device is present in a stable environment of the communication network 10 having a long time interval $t_n$ as illustrated in FIG. 9, and there is a tendency for a transition between a communicable state and a non-communicable state to be frequently repeated. According to macroscopic observation, there is a tendency for these two situations to be repeated.

Thus, as an example of a sample extraction method, a period of time until a time interval $t_n$ until a non-communicable situation occurs again after a transition to a communicable state with a point in time when a non-communicable situation has occurred after a long time interval $t_n$ state as a starting point is set to be a target to be extracted, in consideration of the tendency as illustrated in FIG. 9.

Further, in order to extract such a time interval $t_n$, it is necessary to determine whether or not the time interval $t_n$ is a target to be extracted. Here, the following method is described as an example.

A probability density function f(t) is obtained based on all time intervals $t_n$. The probability density function f(t) has a shape having a plurality of peaks due to the tendency as illustrated in FIG. 9. Furthermore, a time interval $t_0$ which is a minimum value in which f(t)=0 is calculated based on this probability density function f(t). In a case where the probability density function f(t) has a shape having a plurality of peaks, there is a possibility that a plurality of time intervals $t_0$ will be calculated with a plurality of minimum values. In this case, the smallest value among the plurality of time intervals $t_0$ calculated and being minimum values is set to be a determination criterion, and a time interval $t_n$ which is smaller than or equal to or less than the determination criterion is extracted.

Here, in a method of extracting a determination criterion, an average value, a median, or the like of all of the time intervals $t_n$ may be adopted.

Furthermore, a test for detecting a deviation value, such as a Smirnov-Grabs test or a Thompson test, is performed on the extracted time interval to, and a time interval excluding the deviation value is set to be a time interval $t_n$ used for the calculation of a threshold value. Other methods may be applied as a method of excluding a deviation value, and the exclusion of the deviation value is optional.

As described above, it is important whether the device 30 has moved from an unstable environment to a stable environment of the communication network 10, and thus only time intervals $t_n$ in an unstable environment of the communication network in which a communicable state and a non-communicable state are frequently repeated are set to be targets. Thus, it is possible to determine that the communication network has moved to a stable environment by comparing a time elapsed since a communicable state has transitioned to the previous non-communicable state with a threshold value $t_{th}$.

While the embodiment and the example of the present disclosure have been described above in detail, the present disclosure is not limited thereto. For example, in the above-described embodiment, a TCP which is a connection-type protocol is used for the transmission of an application message, but a connectionless-type UDP may be used.

REFERENCE SIGNS LIST

10 Communication network
20 Application
30 Device
100 Message relay apparatus
110 Communication functional unit
111 Communication management unit
112 Communication processing unit
120 Message processing unit
121 Functional unit for specifying application message destination
122 Functional unit for buffering application message
123 Functional unit for forwarding application message
130 State confirmation unit
131 Functional unit for determining device communication state
132 Device communication state DB
133 Communication network state estimation functional unit
134 Communication network state DB

The invention claimed is:

1. A message relay apparatus for receiving an application message from an application and forwarding the received application message to a destination terminal, the message relay apparatus comprising:

a communication availability determination unit, including one or more processors, configured to determine a communication availability with the destination terminal;

a network state estimation unit, including one or more processors, configured to compute a threshold value for a network state between the destination terminal and the message relay apparatus based on an average value of time intervals between multiple periods when the destination terminal is not communicable; and a message processing unit, including one or more processors, configured to determine a forwarding availability of the application message for the destination terminal of the application message received from the application and to buffer the application message when forwarding is not available, wherein the forward availability is determined based on a comparison between the threshold value and a time elapsed since the destination terminal was in a non-communicable state in a previous time.

2. The message relay apparatus according to claim 1, wherein
the communication availability determination unit is configured to transmit a state confirmation message to the destination terminal and determine the communication availability with the destination terminal based on a response message received from the destination terminal with respect to the state confirmation message.

3. The message relay apparatus according to claim 1, wherein
the communication availability determination unit is configured to determine the communication availability with the destination terminal based on a state of connection between the message relay apparatus and the destination terminal which are used to forward the application message.

4. The message relay apparatus according to claim 1, wherein
the communication availability determination unit is configured to determine the communication availability with the destination terminal based on terminal connection state information acquired from a management apparatus of a network that forms a communication path between the message relay apparatus and the destination terminal.

5. The message relay apparatus according to claim 1, wherein
the message processing unit is configured to determine the forwarding availability of the application message based on a current situation related to a temporal change in the communication availability of the destination terminal, and
the network state estimation unit is configured to calculate information regarding the temporal change in the communication availability of the destination terminal, the information being used for determining the forwarding availability.

6. A message relay method for a message relay apparatus deployed in a network to receive an application message from an application and forward the received application message to a destination terminal, the message relay method comprising:

determining a communication availability with the destination terminal;
computing a threshold value for a network state between the destination terminal and the message relay apparatus based on an average value of time intervals between multiple periods when the destination terminal is not communicable; and
determining a forwarding availability of the application message for the destination terminal of the application message received from the application and to buffer the application message when forwarding is not available, wherein the forward availability is determined based on a comparison between the threshold value and a time elapsed since the destination terminal was in a non-communicable state in a previous time.

7. The message relay method according to claim 6, further comprising:
transmitting a state confirmation message to the destination terminal and determine the communication availability with the destination terminal based on a response message received from the destination terminal with respect to the state confirmation message.

8. The message relay method according to claim 6, further comprising:
determining the communication availability with the destination terminal based on a state of connection between the message relay method and the destination terminal which are used to forward the application message.

9. The message relay method according to claim 6, further comprising:
determining the communication availability with the destination terminal based on terminal connection state information acquired from a management apparatus of a network that forms a communication path between the message relay method and the destination terminal.

10. The message relay method according to claim 6, further comprising:
determining forwarding availability of the application message based on a current situation related to a temporal change in the communication availability of the destination terminal, and
calculating, information regarding the temporal change in the communication availability of the destination terminal, the information being used for determining the forwarding availability.

* * * * *